(12) United States Patent
Zhang (10) Patent No.: US 10,066,542 B2
(45) Date of Patent: Sep. 4, 2018

(54) AUTOMATIC BRANCH COMMUNICATION VALVE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 14/926,681

(22) Filed: Oct. 29, 2015

(65) Prior Publication Data
US 2017/0122193 A1 May 4, 2017

(51) Int. Cl.
| | |
|---|---|
| *F02D 23/00* | (2006.01) |
| *F02B 37/20* | (2006.01) |
| *F01N 13/10* | (2010.01) |
| *F02B 37/02* | (2006.01) |
| *F01N 9/00* | (2006.01) |

(52) U.S. Cl.
CPC ............... *F02B 37/20* (2013.01); *F01N 9/00* (2013.01); *F01N 13/10* (2013.01); *F02B 37/025* (2013.01); *F01N 2240/36* (2013.01); *F01N 2290/04* (2013.01); *F01N 2290/10* (2013.01); *Y02T 10/144* (2013.01); *Y02T 10/47* (2013.01)

(58) Field of Classification Search
CPC ............ F02B 37/025; Y10T 137/7786; Y10T 137/7898; F16K 15/033; F16K 7/08
See application file for complete search history.

(56) References Cited

U.S. PATENT DOCUMENTS

| | | | | | |
|---|---|---|---|---|---|
| 3,423,926 | A | * | 1/1969 | Holzhausen | ............ F01D 9/026 415/146 |
| 3,557,549 | A | * | 1/1971 | Webster | ................ F01D 17/148 60/602 |
| 3,591,959 | A | * | 7/1971 | Kubis | .................... F02B 37/025 123/323 |
| 3,938,330 | A | * | 2/1976 | Nakajima | ............... F01N 13/10 60/282 |
| 5,355,673 | A | * | 10/1994 | Sterling | ................ F01N 13/082 137/527 |
| 5,867,987 | A | * | 2/1999 | Halimi | .................. F02B 37/025 60/602 |
| 5,943,864 | A | * | 8/1999 | Sumser | ................. F01D 17/148 60/602 |
| 9,068,501 | B2 | | 6/2015 | Styles et al. | |
| 2008/0000460 | A1 | | 1/2008 | Hertweck et al. | |
| 2014/0219849 | A1 | | 8/2014 | Styles et al. | |

OTHER PUBLICATIONS

McConville, Gregory Patrick et al., "Exhaust Control Valve Branch Communication and Wastegate," U.S. Appl. No. 14/668,498, filed Mar. 25, 2015, 58 pages.
Zhang, Xiaogang, "Exhaust Control Valve," U.S. Appl. No. 14/806,324, filed Jul. 22, 2015, 71 pages.

* cited by examiner

*Primary Examiner* — Ngoc T Nguyen
(74) *Attorney, Agent, or Firm* — Julia Voutyras; McCoy Russell LLP (57) ABSTRACT

Methods and systems are provided for an automatic branch communication valve. In one example, a method includes rotating the valve to a second position in response to a non-electrical actuation of the valve.

20 Claims, 5 Drawing Sheets

AUTOMATIC BRANCH COMMUNICATION VALVE

FIELD

The present description relates generally to methods and systems for a valve of an engine.

BACKGROUND/SUMMARY

Twin, or dual, scroll turbocharger configurations may be used in turbocharged engines. A twin scroll turbocharger configuration may separate an inlet to a turbine into two separate passages connected to exhaust manifold runners. In this way, exhaust from the engine cylinders, whose exhaust gas pulses may interfere with each other, are fluidly separated.

For example, on an I4 engine with a cylinder firing order of exhaust manifold runners 1-3-4-2, exhaust manifold runners 1 and 4 may be connected to a first inlet of a twin scroll turbine and exhaust manifold runners 2 and 3 may be connected to a second inlet of said twin scroll turbine, where the second inlet is different and fluidly separated from the first inlet. In this way, separating exhaust gas pulses may result in an increase in efficiency of exhaust gas delivery to a turbine in some cases.

However, under some engine operating conditions, separating exhaust gas pulses as described above may reduce an efficiency of exhaust gas delivery to a turbine. For example, under certain engine operating conditions, e.g., high speed and high load conditions, separating exhaust gas pulses may result in an increase in backpressure and pumping work. This increase in backpressure and pumping work may be due to more restrictive, lower volume passages between the exhaust and the turbine in a dual scroll turbine, as compared to a passage that is not separated in a single scroll turbine. As such, the amount of exhaust gas in the cylinder may raise the pressure in the lower volume passages compared to the relatively larger volume, unseparated passage. The increased backpressure may also result in higher levels of hot residual gas in the cylinder, and may reduce the engine's output power.

One example approach for reducing backpressure and pumping work in a twin scroll turbocharger has been shown by Styles et al. in US 2014/0219849. Therein, systems positioning a branch communication valve between a first scroll and a second scroll in a twin (e.g., dual) scroll turbocharger system is provided. In an example, a branch communication valve may be positioned adjacent to a dividing wall separating a first scroll and a second scroll of the twin turbocharger. In an open position, the branch communication valve may increase fluid communication between the first scroll and the second scroll, and in a closed position, the branch communication valve may decrease fluid communication between the first scroll and the second scroll. In some examples, each scroll may include a corresponding wastegate and a corresponding wastegate valve to control the amount of exhaust gas which passes through turbine.

The inventors herein have recognized a potential issue with the example approach of Styles et al. For example, there may be cost, weight, and packaging penalties associated with an electrically actuated branch communication valve. Further, there may also be an additional burden on an engine control and monitoring system when two or more valves are implemented and adjusted by the aforementioned system based on engine operating conditions.

In one example, the issues described above may be addressed by a turbocharger system comprising a first scroll, a second scroll fluidly separated from the first scroll via a dividing wall, an adaptor coupled to an outlet of an exhaust manifold, an inlet of the first scroll, and an inlet of the second scroll, and a twisted valve coupled within the adaptor to rotate in response to a non-electrical actuation of a spring. In this way, the twisted valve may be actuated in response to an engine condition.

As one example, the twisted valve may be rotated to a first position in response to a decreased exhaust pressure where the twisted valve may maintain a separation of exhaust gas from first and second cylinder banks. Alternatively, the twisted valve may be rotated to a second position in response to an exhaust pressure greater than a force of the spring actuating the twisted valve in order mix exhaust gas from the first and second banks and decrease an exhaust backpressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4 are shown approximately to scale, although other relative dimensions may be used.

DETAILED DESCRIPTION

Figure 3:
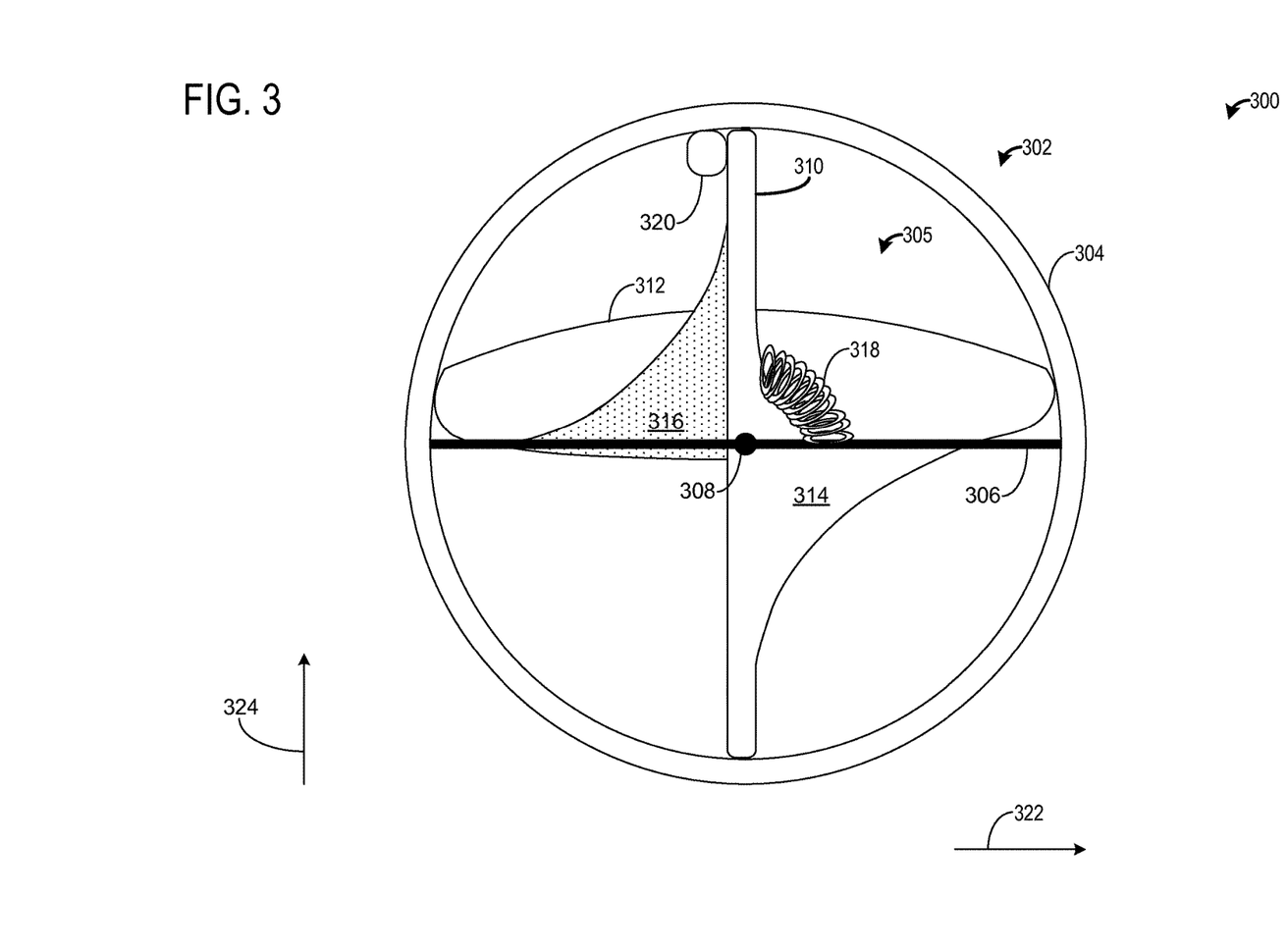
FIG. 3 shows the automatic branch communication valve in a first position.
Figure 4:
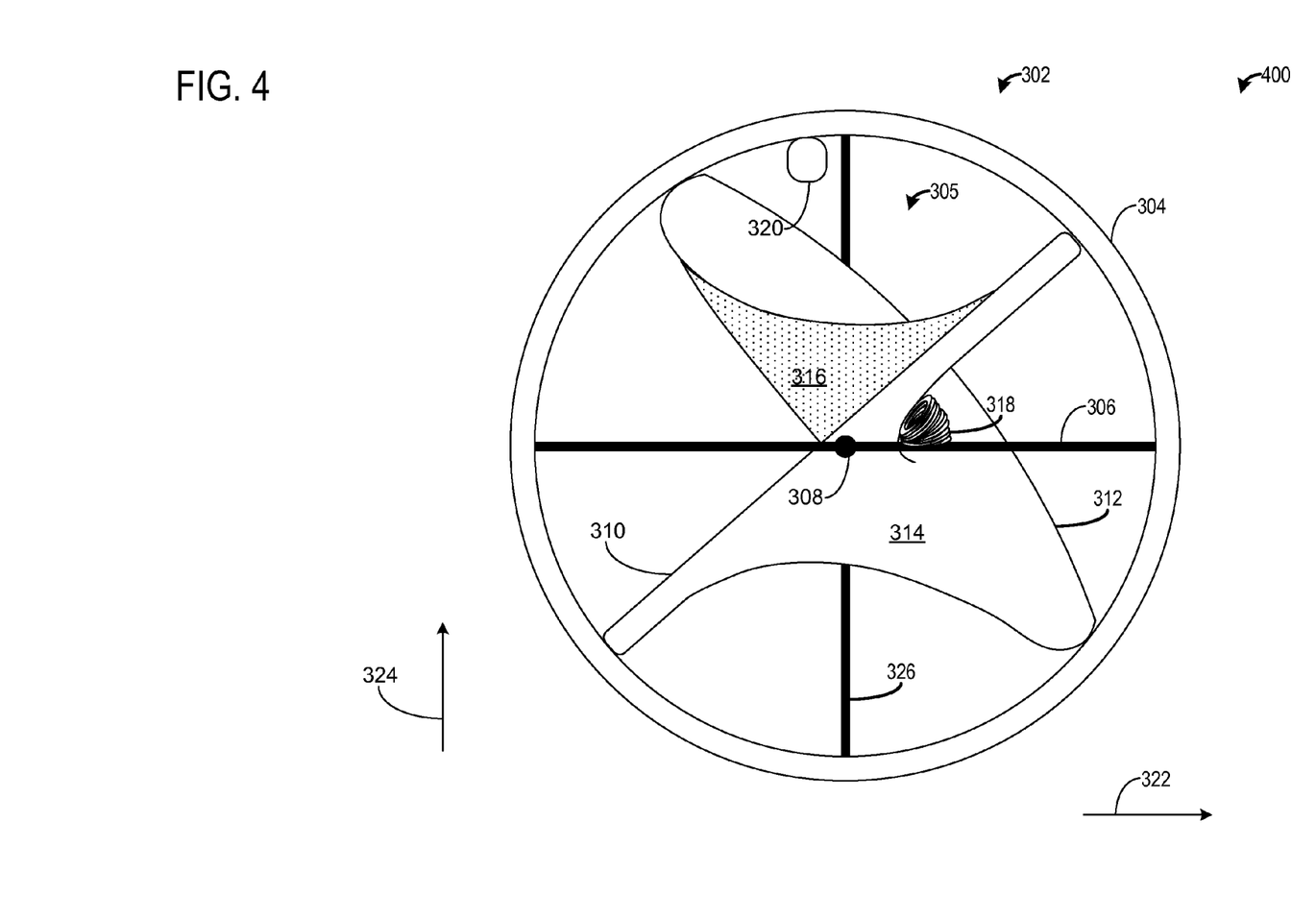
FIG. 4 shows the automatic branch communication valve in a second position.
Figure 5:
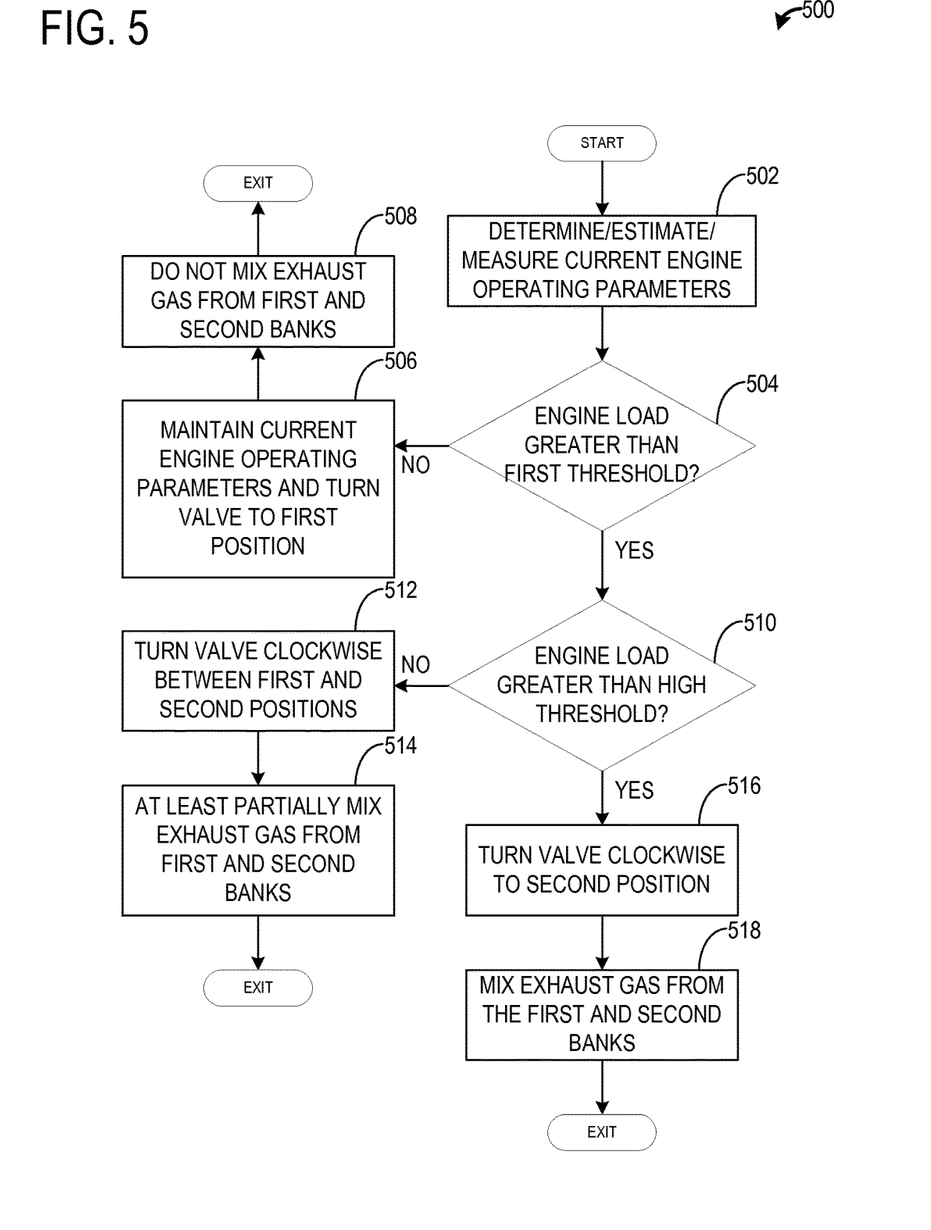
FIG. 5 shows a method for operating the branch communication valve.

The following description relates to systems and methods for operating a valve, specifically a branch communication valve (BCV). The BCV may be coupled to an exhaust manifold and a twin-scroll turbine of an engine shown in FIG. 1. The BCV may be an adapter comprising a tube with a twisted valve plate rotatably coupled to a frame support of the BCV shown in FIG. 2. The BCV may be an automatic BCV, where the BCV separates or mixes exhaust flow from first and second cylinder banks of the engine based on a non-electric actuation of a spring coupled to the twisted valve. The spring may be biased toward a first position in order to maintain exhaust gas separation between the first and second cylinder banks as shown in FIG. 3. As exhaust gas pressure increases, the spring may be compressed, turning the BCV clockwise to a second position in order to allow the exhaust gases from the first and second cylinder banks to mix as shown in FIG. 4. A method for operating the BCV is shown in FIG. 5.

The twisted valve may include a twisted dividing plane formed by a thin wall of constant thickness but twisted along the direction of exhaust gas flow and/or the central axis of the passage. The twisted dividing plane may fully divide the passage into only and exactly two parallel passages, rotation of the twisted plane changing communication between only two inlets and only two outlets. The total degree of rotation to change passage communications between the inlets/outlets may be equal to the full degree of static twisting of the plane itself from inlet to outlet. The inlet and outlet ends, respectively, of the twisted plane may be alternately aligned with the dividing walls of the inlet passages and outlet passages leading to and from the twisted plane, respectively.

Figure 1:
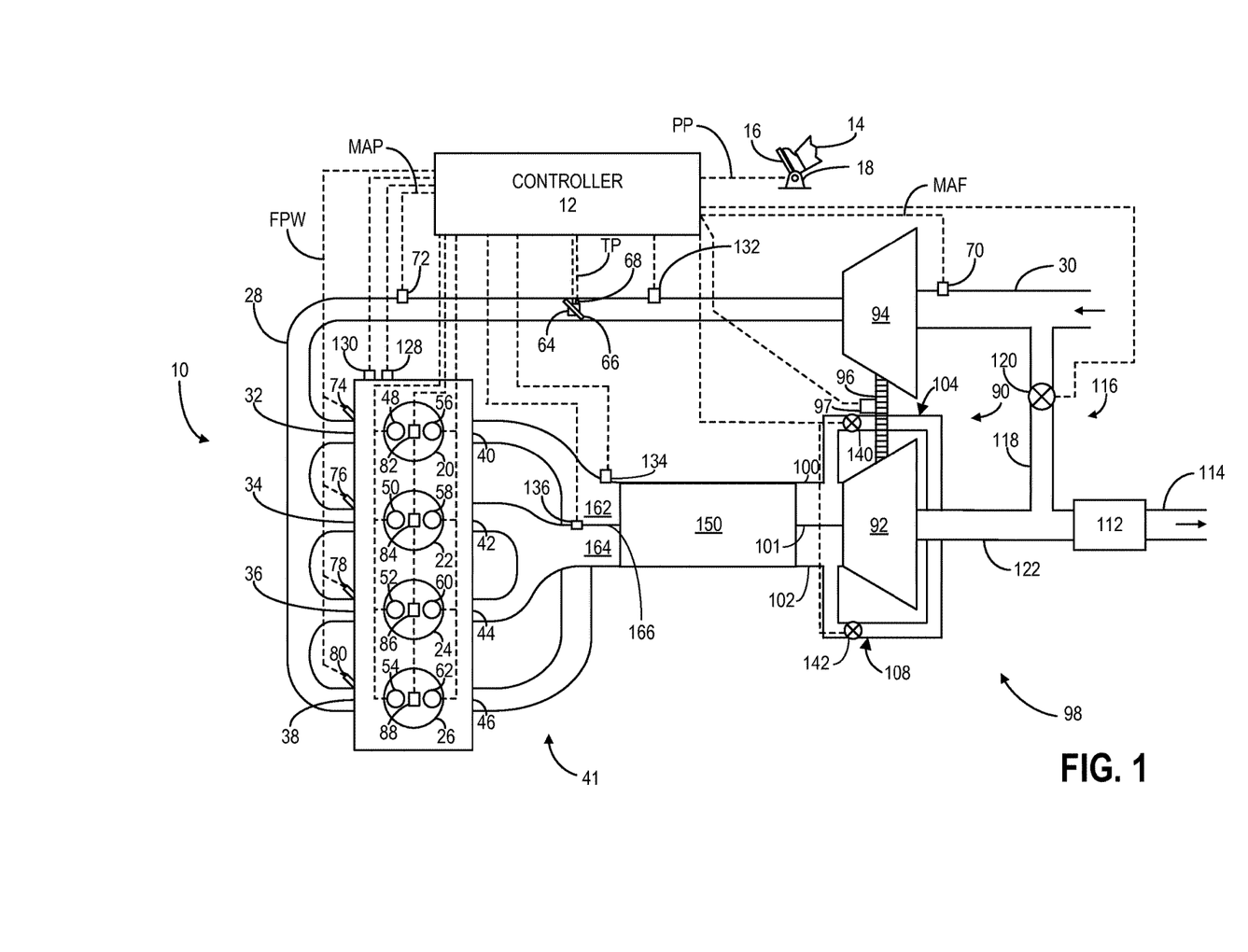
FIG. 1 shows a schematic diagram of an example engine including a dual (twin) scroll turbocharger and a branch communication valve.

Turning now to FIG. 1, a schematic diagram of an engine 10, which may be included in a propulsion system of a vehicle, is shown. Engine 10 may be controlled at least partially by a control system including controller 12 and by input from a vehicle operator 14 via an input device 16. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors (not shown), which may include user inputs and/or sensors (such as transmission gear position, gas pedal input, exhaust manifold temperature, air-fuel ratio, vehicle speed, engine speed, mass airflow through the engine, boost pressure, ambient temperature, ambient humidity, intake air temperature, cooling system sensors, and others). The controller 12 may also send a plurality of control signals to various engine actuators (not shown) in order to adjust engine operation based on signals received from the sensors (not shown). In this example, input device 16 includes an accelerator pedal and a pedal position sensor 18 for generating a proportional pedal position signal PP. Engine 10 may be included in a vehicle such as a road vehicle, among other types of vehicles. While the example applications of engine 10 will be described with reference to a vehicle, it should be appreciated that various types of engines and vehicle propulsion systems may be used, including passenger cars, trucks, etc.

Engine 10 may include a plurality of combustion chambers (i.e., cylinders). Engine 10 may include combustion chambers 20, 22, 24, and 26, arranged in an inline four configuration. It should be understood, however, that though FIG. 1 shows four cylinders, engine 10 may include any number of cylinders. For example, engine 10 may include any suitable number of cylinders, e.g., 2, 3, 4, 5, 6, 8, 10, 12, or more cylinders in any configuration, e.g., V-6, I-6, V-12, opposed 4, etc. Though not shown in FIG. 1, each combustion chamber (i.e. cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber may receive intake air from an intake manifold 28 via an air intake passage 30. Intake manifold 28 may be coupled to the combustion chambers via intake ports. For example, in FIG. 1, intake manifold 28 is shown coupled to cylinders 20, 22, 24, and 26 via intake ports 32, 34, 36, and 38, respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. Each respective exhaust port may direct exhaust combustion gases from a respective cylinder to an exhaust manifold or exhaust passage.

Each cylinder intake port can selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIG. 1, in some examples, each intake and exhaust valve may be operated by an intake cam and an exhaust cam, respectively. Alternatively, one or more of the intake and exhaust valves may be operated by an electromechanically controlled valve coil and armature assembly (not shown). The position of an intake cam may be determined by an intake cam sensor (not shown). The position of exhaust cam may be determined by an exhaust cam sensor (not shown).

Intake passage 30 may include a throttle 64 having a throttle plate 66. In one example, a position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided to the combustion chambers. The position of throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12. MAP and MAF may not both be present, and only one sensor may be used.

In FIG. 1, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or on the top of the respective combustion chamber, for example. In other examples, one or more fuel injectors may be arranged in the air intake manifold 28 in a configuration that provides what is known as port injection of fuel into the intake ports (e.g., intake ports 32, 34, 36, and 38) upstream of combustion chambers. Though not shown in FIG. 1, fuel injectors may be configured to deliver fuel received via a high pressure fuel pump (not shown) and a fuel rail (not shown). Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12. In some examples, fuel may be injected directly into each respective combustion chamber. This may be referred to as direct injection. Indirect injection may be used in other examples.

The combustion chambers of engine 10 may be operated in a compression ignition mode, with or without an ignition spark. In some examples, a distributorless ignition system (not shown) may provide an ignition sparks to spark plugs coupled to the combustion chambers in response to controller 12. For example, spark plugs 82, 84, 86, and 88 are shown in FIG. 1 coupled to cylinders 20, 22, 24, and 26, respectively.

As mentioned above, intake passage 30 may communicate with one or more cylinders of engine 10. In some embodiments, one or more of the intake passages may include a boosting device such as a turbocharger 90. Turbocharger 90 may be include a turbine 92 and a compressor 94 coupled on a common shaft 96. The blades of turbine 92 may be caused to rotate about the common shaft 96 as a portion of the exhaust gas stream or flow discharged from engine 10 impinges upon the blades of the turbine. Compressor 94 may be coupled to turbine 92 such that compressor 94 may be actuated when the blades of turbine 92 are caused to rotate. When actuated, compressor 94 may then direct pressurized fresh gas to air intake passage 28 where it may then be directed to engine 10. A speed of the turbine 92 may be inferred from one or more engine operating conditions. In some examples, the rotational speed of the turbine 92 may be measured with a sensor. For example a speed sensor 97 may be coupled with common shaft 96. A signal indicative of the speed may be delivered, for example, to the controller 12.

Turbine 92 may include at least one wastegate to control an amount of boost provided by said turbine. In a dual scroll system, both scrolls may share a wastegate or have individual wastegates to control an amount of exhaust gas which passes through turbine 92. For example, in FIG. 1, the first scroll 100 and second scroll 102 include wastegate passages 104 and 108 respectively. Exhaust flow through wastegate passage 104 may be controlled by a valve, such as a first valve 140 discussed below, to regulate the amount of exhaust gas bypassing turbine 92. Likewise, wastegate passage 108 may be controlled by a second valve 142. In one embodiment, an area of an opening of the wastegate passage 104 may be positioned equally open to each of the scrolls, such that substantially similar amounts of exhaust gas flow may exit each of the scrolls into wastegate passage 104 during some conditions.

Engine 10 may employ a dual scroll (or twin scroll or two-pulse) turbocharger system 98 wherein at least two separate exhaust gas entry paths flow into and through turbine 92. A dual scroll turbocharger system may be configured to separate exhaust gas from cylinders whose exhaust gas pulses interfere with each other when supplied to turbine 92. For example, FIG. 1 shows a first scroll 100 and a second scroll 102, wherein each of the first scroll and second scroll may be used to supply separate exhaust flow to turbine 92. The cross-sectional shape of first scroll 100 and second scroll 102 may be of various shapes, including circular, square, rectangular, D-shaped, etc.

For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then cylinder 20 may be ending its expansion stroke and opening its exhaust valves while cylinder 22 still has its exhaust valves open. In a single-scroll or undivided exhaust manifold, the exhaust gas pressure pulse from cylinder 20 may interfere with the ability of cylinder 22 to expel its exhaust gases. However, by using a dual scroll turbocharger system, wherein exhaust ports 40 and 46 from cylinders 20 and 26 are connected to one inlet of the first scroll 100, and exhaust ports 42 and 44 from cylinders 22 and 24 are connected to the second scroll 102, exhaust pulses or gas flow may be separated, and pulse energy driving the turbine may be increased. Herein, cylinders 20 and 26 may be referred to as a first bank and cylinders 22 and 24 may be referred to as a second bank. The first bank may comprise a first bank outlet passage 162 and the second bank may comprise a second bank outlet passage 164 where the two outlet passages are separated by a wall 166. Gas from the first bank does not mix with gas from the second bank upstream of an adapter 150.

Exhaust gases exiting turbine 92 and/or a wastegate via wastegate passage 104 may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), selective catalytic reduction catalyst (SCR), and a diesel particulate filter (DPF). After passing through emission control device 112, exhaust gas may be directed to a tailpipe 114.

Engine 10 may include an exhaust gas recirculation (EGR) system 116. EGR system 116 may deliver a portion of exhaust gas exiting engine 10 into the engine air intake passage 30. The EGR system includes an EGR conduit 118 coupled to a conduit or exhaust passage 122, downstream of the turbine 92, and to the intake passage 30. In some examples, EGR conduit 118 may include an EGR valve 120 configured to control an amount of recirculated exhaust gas. As shown in FIG. 1, EGR system 116 is a low pressure EGR system, routing exhaust gas from downstream of the turbine 92 to upstream of the compressor 94. In some examples, an EGR cooler (not shown) may be placed along EGR conduit 118 which may serve to reduce the temperature of the exhaust gas being re-circulated. In another example, a high pressure EGR system may be used in addition to or in place of the low pressure EGR system. As such, the high pressure EGR system may route exhaust gas from one or more of the first scroll 100 and second scroll 102, upstream of the turbine 92, to the intake passage 30, downstream of the compressor 34. The first scroll 100 and the second scroll 102 are separated by a dividing wall 101 and are not in fluid communication with one another. Gas in the first scroll 100 does not mix with gas in the second scroll 102. Furthermore, the first bank may provide gas to only the first scroll 100 under some conditions. Likewise, the second bank may provide gas to only the second scroll 102 under some conditions. Alternatively, under different conditions, the first bank and the second bank may provide gas to both the first scroll 100 and the second scroll 102 simultaneously.

Under some conditions, EGR system 116 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors, which may include user inputs and/or sensors (such as transmission gear position, gas pedal input, exhaust manifold temperature, air-fuel ratio, vehicle speed, engine speed, mass airflow through the engine, ambient temperature, ambient humidity, intake air temperature, cooling system sensors, and others). The controller may also send a plurality of control signals to various engine actuators (not shown) in order to adjust engine operation based on signals received from the sensors (not shown). In this example, input device 16 includes an accelerator pedal and a pedal position sensor 18 for generating a proportional pedal position signal PP. Further, controller 12 is shown in FIG. 1 receiving various signals from sensors coupled to engine 10, in addition to those signals previously discussed, including: engine coolant temperature (ECT) from a temperature sensor 128; an engine position sensor 130, e.g., a Hall effect sensor sensing crankshaft position. Barometric pressure may also be sensed (sensor not shown) for processing by controller 12. In some examples, engine position sensor 130 produces a predetermined number of equally spaced pulses every revolution of the crankshaft from which engine speed (RPM) can be determined. Additionally, various sensors may be employed to determine turbocharger boost pressure. For example, a pressure sensor 132 may be disposed in intake passage 30 downstream of compressor 94 to determine boost pressure. Additionally, each scroll of the dual scroll system 98 may include various sensors for monitoring operating conditions of the dual scroll system. For example, the first scroll 100 may include an exhaust gas sensor 134 and the second scroll 102 may include an exhaust gas sensor 136. Exhaust gas sensors 134 and 136 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some cases a single sensor may be used to, for example, sense an air/fuel ratio. The single sensor may be used in place of using sensors 134 and 136, and may be positioned, for example, downstream from the turbine in the conduit or exhaust passage 122.

Each scroll may receive exhaust gas from a specific set of cylinders (e.g., the first bank or the second bank) via specific exhaust manifold segments and distinct inlets. Exhaust gases flowing from the first bank and the second bank to the first scroll 100 and the second scroll 102 may be separated by the adapter 150 (e.g., a branch communication valve) during some engine conditions. As discussed above, separating exhaust gas flow (i.e. exhaust gas pulses) in the first and second scrolls may increase low-end engine torque and reduce a duration desired to achieve said torque. As a result, during certain conditions such as low engine load, separating the exhaust gas pulses (e.g., the first bank provides gas to only the first scroll 100 and the second bank provides gas to only the second scroll 102) may result in an increase in efficiency of exhaust gas flow delivery to a turbine. However, during some engine operating conditions, separating exhaust gas pulses as described above may reduce the efficiency of exhaust gas delivery to the turbine. For example, during high engine speed and/or load, separating exhaust gas pulses as described above may increase backpressure and pumping work due, in part, to a smaller, more restrictive lower scroll volume between the exhaust valve and the turbine compared to a combined, unseparated single turbine inlet scroll. In other words, a volume of exhaust gas exiting the cylinder(s) may raise the pressure more in the aforementioned dual scroll configuration, since the separated first scroll and second scroll may have a relatively smaller volume as compared to a scroll configuration where the scrolls or passages are not separated. In response, engine power output may be reduced.

Increasing fluid communication and conveyance between the separate exhaust passages during certain engine operating conditions, such as high speed and/or high load, may allow increased engine efficiency and power output. Thus, the BCV 150 may mix gas provided from the first and second banks upstream of the first scroll 100 and the second scroll 102, such that gas provided to the first scroll 100 is from the first and second banks and gas provided to the second scroll 102 is also from the first and second banks. In this way, BCV 150 may be adjusted in order to mix exhaust gas from the first bank and the second bank. The BCV 150 is coupled to an exhaust manifold 41 at an upstream end and to the turbine 92 at a downstream end. Exhaust gas may actuate the BCV 150 based on an exhaust gas pressure, wherein as the exhaust gas pressure increases, the BCV 150 moves toward a non-biased position in order to allow exhaust gases from the first and second cylinder banks to mix prior to flowing to the turbine 92.

As shown in the example embodiment illustrated in FIG. 1, BCV 150 may be positioned such that the valve bridges the first scroll 100 and the second scroll 102. As such, in one example, turning BCV 150 toward a second position may provide a passage to increase fluid conveyance between the exhaust manifold 41 and the twin scroll turbine 92. Further, the BCV 150 may be opened a metered amount (e.g., between a first position and the second position) to each of the first and second scrolls, such that gas mixing in the BCV may be restricted to a desired amount. In another example, BCV 150 may be completely or fully turned in a single direction toward the second position such that there may be a larger amount of gas from the first bank mixing with gas from the second bank in the BCV 150, compared to the less than complete (e.g., metered) turning of the BCV 150

In yet another example, turning the BCV 150 toward the first position may decrease mixing in the BCV 150. In some cases, the valve may be completely or fully turned to the first position such that considerably no exhaust gas may mix from the first bank and the second bank. In other words, substantially all exhaust gas flow within the first scroll and all exhaust flow within the second scroll consists of gas from the first bank and the second bank respectively.

The controller 12 receives signals from the various sensors of FIG. 1 and employs the various actuators of FIG. 1 to adjust engine operation based on the received signals and instructions stored on a memory of the controller.

Figure 2:
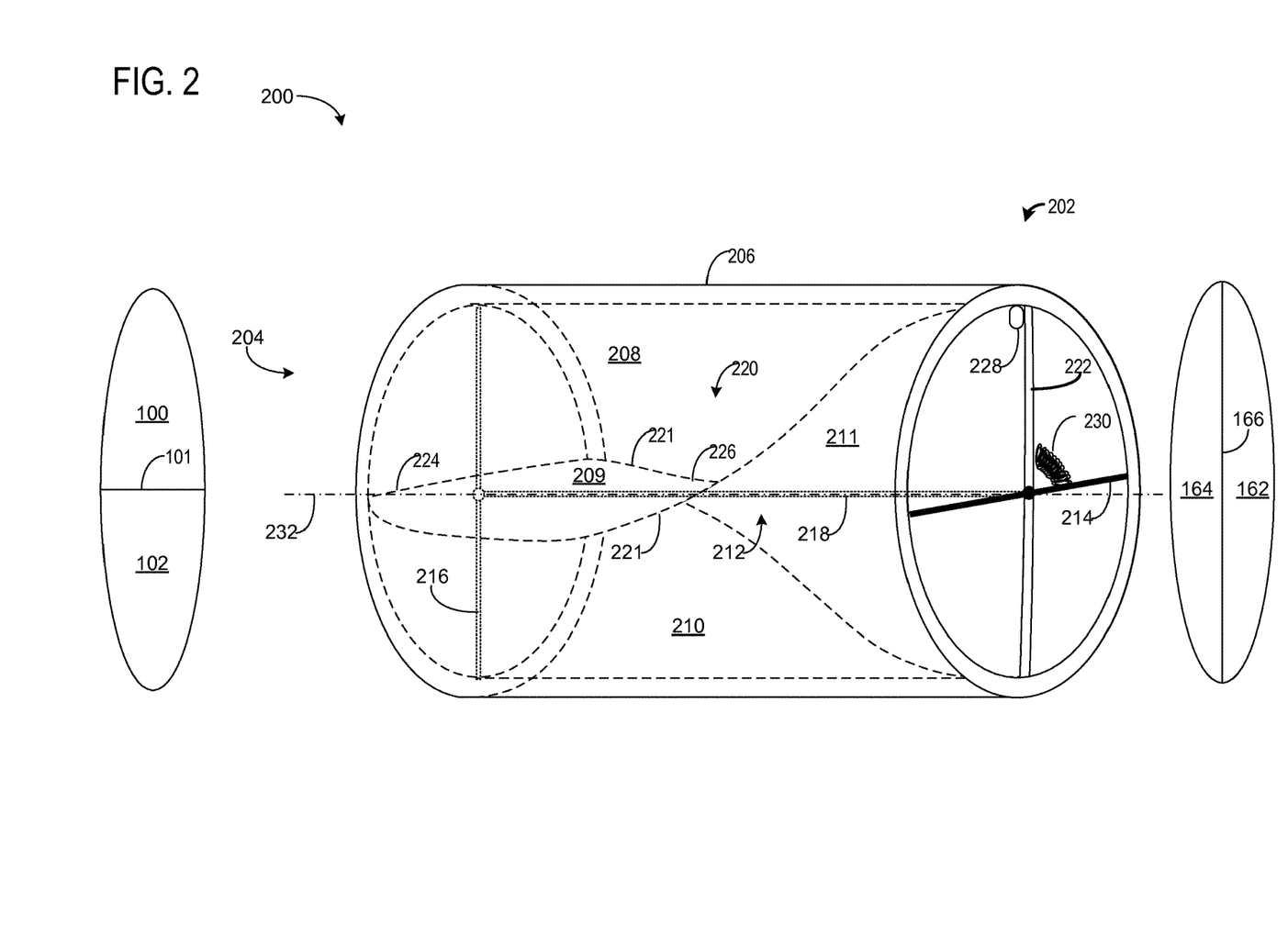
FIG. 2 shows a structure of an automatic branch communication valve.

Turning now to FIG. 2, a side-on depiction of an adapter 200 is shown. The adapter 200 may be used similarly to adapter 150 in the embodiment of FIG. 1. Thus, the adapter 200 may be coupled to an exhaust manifold (e.g., exhaust manifold 41) of an engine (e.g., engine 10) at an upstream face 202 and coupled to a twin scroll turbine (e.g., turbine 92) at a downstream face 204. As such, components previously introduced are similarly numbered for reasons of brevity.

An outer pipe 206 is in face-sharing contact with exhaust conduit walls of the exhaust manifold and the turbine such that a diameter of the outer pipe 206 is substantially equal to a diameter of the exhaust conduit. The outer pipe 206 fluidly couples the exhaust manifold to the turbine such that exhaust flows from the manifold, through an interior passage of the outer pipe 206, and into the turbine. Exhaust gas is initially received through the upstream end 208 before flowing to the downstream face 204 and into the turbine. The outer pipe 206 is fixed and does not rotate.

A support frame 212 is located within the outer pipe 206 and comprises a front support frame 214, a rear support frame 216, and a central support frame 218. The front support frame 214 is proximal to the exhaust manifold while the rear support frame 216 is proximal to the turbine. The front support frame 214 is perpendicular to the rear support frame 216. Both the front and rear support frames 214 and 216, respectively, extend across an entire diameter of the outer pipe 206 and are physically coupled to interior surfaces of the outer pipe 206. In this way, the front support frame 214 and the rear support frame 216 are also stationary.

The central support frame 218 is rotatably fitted to central receiving holes of the front support frame 214 and the rear support frame 216. The central support frame 218 may pivot within the receiving hole and extends through at least a portion of the front support frame 214 and the rear support frame 216. The central support frame 218 extends along an entire length of the outer pipe 206.

A valve plate 220 is physically coupled to the central support frame 218 and rotates in congruence with a rotation of the central support frame 218. The valve plate 220 is substantially equal in length to the central support frame 218. The valve plate 220 may rotate within the outer pipe 206 in order to separate or mix an exhaust flow received from the exhaust manifold.

The valve plate 220 may create two channels within the outer pipe 206. A first channel 208 may be in fluid communication with a top side 209 of the valve plate 220. A second channel 210 may be in fluid communication with a bottom side 211 of the valve plate 220. The first channel 208 aligns with a first bank exhaust outlet 162 and receives exhaust gas from only the first bank when the valve plate 220 is in the first position. The second channel 210 aligns with a second bank exhaust outlet 164 and receives exhaust gas from only the second bank when the valve plate 220 is in the first position. Thus, the valve plate 220 aligns with a wall 166 and the two components separate their respective fluid passages such that gas in a first passage may not flow into a second passage on an opposite side of the divider (e.g., the valve plate 220 or the wall 166). The first channel 208 and the second channel 210 are not in fluid communication regardless of a position of the valve plate 220. Thus, exhaust gas in contact with the top side 209 may not come into contact with the bottom side 211 while flowing through the adapter 200.

Furthermore, while the valve plate 220 is in the first position, the first channel 208 aligns with a first scroll 100, the second channel 210 aligns with a second scroll 102, and the valve plate aligns with a divider 101. In this way, gas received by the first scroll 100 is from the first channel 208 and gas received by the second scroll 102 is from the second channel 210, as will be described in greater detail below.

An entirety of a periphery 221 of the valve plate 220 is in rotatable contact with interior surfaces of the outer pipe 206. The valve plate 220 rotates within the outer pipe 206, based on a compression and/or expansion of a spring 230, while allowing substantially no gas to flow between the valve plate 220 and the interior surfaces of the outer pipe 206 (e.g., from the first channel 208 to the second channel 210). As an example, the interior surfaces of the outer pipe 206 may be lubricated in order to allow the valve plate 220 to rotate while simultaneously mitigating gas flow between the valve plate 220 and the interior surfaces of the outer pipe 206.

The valve body 220 comprises a front portion 222, a rear portion 224, and a central portion 226. The central portion 226 of the valve plate 220 is twisted due to a perpendicular relationship between the front portion 222 and the rear portion 224 of the valve plate 220. The central portion 226 is connected to the front portion 222 and the rear portion 224 while maintaining rotatable contact to the interior surfaces of the outer pipe 206 along periphery 221. Thus, the central portion 226 is parallel to the front portion 222 near the upstream face 202 of the valve 200 (e.g., perpendicular to the rear portion 224) and parallel to the rear portion 224 near the downstream face 204 of the valve 200 (e.g., perpendicular to the front portion 222).

In a first position, the front portion 222 of the valve plate 220 is perpendicular to the front support frame 214 (e.g., parallel with the rear support frame 216). Furthermore, the front portion 222 of the valve plate 220 aligns with a barrier separating exhaust flow from a first bank and second bank of engine cylinders in the exhaust manifold, as described above with respect to FIG. 1. The rear portion 224 of the valve plate 220 is perpendicular to the rear support frame 216 and the front portion 222 (e.g., parallel to the front support frame 214). The rear portion 224 aligns with the divider 101 separating the first scroll 100 and the second scroll 102 in the turbine in order to maintain a separation of exhaust gas when the valve plate 220 is in the first position. The first channel 208 and the second channel 210 follow the twist of the valve plate 220 toward the twin scroll turbine. For the valve plate 220 in the first position, exhaust gas is expelled from the first bank outlet passage 162, through the first channel 208, and into the first scroll 100 of the turbine without mixing with exhaust gas from the second bank. Likewise, exhaust gas is expelled from the second bank outlet passage 164, through the second channel 210, and into the second scroll 102 of the turbine without mixing with exhaust gas from the first bank. In this way, the first bank passage 162, the first channel 208, and the first scroll 100 are in fluid communication while remaining fluidly separated from the second bank passage 164, the second channel 210, and the second scroll 102.

The valve plate 220 may be actuated by exhaust gas expelled from the engine. During engine conditions including low exhaust gas pressure (e.g., low load), the front portion 222 is in physical contact with a stopper 228 and the spring 230 is fully extended. The stopper 228 is physically coupled to an interior of the outer pipe 206 near the upstream face 202. The spring 230 is coupled to both the front support frame 214 and the front portion 222 of the valve plate 220.

The spring 230 is biased such that in an absence of an exhaust pressure greater than a threshold pressure, the spring 230 pushes the valve plate 220 to the first position where the front portion 222 is pressed against the stopper 228 due to a counterclockwise rotation of the valve plate 220. The threshold pressure may be based on an exhaust pressure able to overcome a force (e.g., bias) of the spring 230. When in the first position, the valve plate 220 guides exhaust gas through the valve 200 such that exhaust gas from the first bank and second bank remain separate as they flow into the twin scroll turbine via the first channel 208 and the second channel 210, respectively. Thus, in the current example, the valve 200 is shown in the first position.

During higher engine loads comprising an exhaust gas pressure greater than the threshold pressure, the valve plate 220 may begin to rotate about a central axis 232 in a clockwise direction toward the second position. As the valve plate 220 begins to rotate, it no longer touches the stopper 228 and the spring 230 becomes increasingly compressed. Furthermore, exhaust gas from the first 162 and second 164 exhaust outlets may mix in one or more of the first 208 or second 210 channels due to a rotation of the valve plate 220 disrupting the alignment described above. For example, as the valve rotates toward the second position, the first channel 208 no longer aligns with the first bank exhaust outlet 162, the second channel 210 no longer aligns with the second bank exhaust outlet 164, and the valve plate 220 does not align with the wall 166. The first channel 208 may receive exhaust gas from the first bank exhaust outlet 162 and the second bank exhaust outlet 164 based on a degree of rotation toward the second position. As the degree of rotation increases, an increased amount of gas is received from the second bank exhaust outlet and a decreased amount of gas is received from the first bank exhaust outlet. The second channel 210 may receive exhaust gas from the first bank exhaust outlet and the second bank exhaust outlet based on the degree of rotation toward the second position. As the degree of rotation increases (e.g., more toward the second position), the second channel 210 may receive an increased amount of exhaust gas from the first bank exhaust outlet and a decreased amount of exhaust gas from the second bank exhaust outlet. In this way, exhaust gas from the first bank and the second bank may mix within the first channel 208 and the second channel 210, while maintaining exhaust gas in the first channel 208 remains separated from exhaust gas in the second channel 210.

Furthermore, as the valve plate 220 rotates to the second position, the first scroll 100 and the second scroll 102 receive an exhaust mixture from the first and second channels 208 and 210 respectively, where the exhaust mixture consists of exhaust gas from the first bank and the second bank. Additionally, exhaust from the first channel 208 and the second channel 210 are no longer maintained separate as the exhaust flows into the first scroll or the second scroll. However, even when the valve plate 220 rotates toward the second position, exhaust gas does not pass through any of the wall 166, valve plate 220, and divider 101.

FIG. 2 depicts an isometric view of a valve (e.g., BCV) coupled to an exhaust manifold and a twin scroll turbine. The BCV may maintain an exhaust gas separation between first and second cylinder banks from the exhaust manifold to the twin scroll turbine. The exhaust gas from the first cylinder bank may enter a first inlet of the twin scroll turbine, as guided by the BCV in a first position. Likewise, the exhaust gas from the second cylinder bank may enter a second inlet of the twin scroll turbine, as guided by the BCV in the first position. FIG. 3 depicts a face-on view of the BCV in the first position.

Turning now to FIG. 3, a face-on isometric view 300 of a valve 302 in a first position is shown. The valve 302 may be used similarly to the adapter 200 in the embodiment of FIG. 2 or valve 150 in the embodiment of FIG. 1. Valve 302 may be an automatic BCV where the valve is actuated via a pressure of exhaust gas and is not electrically actuated. In this way, operation of an engine (e.g., engine 10) automatically adjusts the valve 302 without the use of any electronic actuators.

Arrow 322 shows a right direction and arrow 324 shows a top direction. The arrows 322 and 324 may be used to describe relative locations and directions of components within the valve 302.

An outer pipe 304 houses a valve plate 305 via a support frame. The support frame may comprise a front support frame 306, a central support frame 308, and a rear support frame (not shown). The rear support frame is eclipsed by a front portion 310 of the valve plate 305 when the valve 302 is in the first position as shown. As described above, the front support frame 306 is fixed and does not rotate with a rotation of the valve plate 305. A divider located between the first and second bank exhaust outlets is perpendicular with the front support frame 306 independent of a position of the valve plate 305. The central support frame 308 is rotatable and rotates congruently with the valve plate 305. Thus, the central support frame 308 is rotatably inserted into the front support frame 306 and the rear support frame.

The valve plate 305 comprises the front portion 310 and a rear portion 312. The front portion 310 is perpendicular to the front support frame 306 and the rear portion 312 is parallel to the front support frame 306 when the valve plate 305 is in the first position. Thus, the front portion 310 is perpendicular to the rear portion 312 such that a body of the valve plate 305 is twisted. Due to its twisted nature, the valve plate 305 comprises an upper side 314 and a lower side 316. The upper side 314 is in fluid communication with the first bank exhaust outlet and the lower side 316 is in fluid communication with the second bank exhaust outlet when the valve plate 305 is in the first position. Thus, a channel formed by the upper side 314 (e.g., first channel 208 of FIG. 2) aligns with the first bank exhaust outlet and twists in order to guide exhaust from the first cylinder bank into a corresponding inlet (e.g., a first scroll) of the twin scroll turbine. Likewise, a channel formed by the lower side 316 (e.g., the second channel 210) aligns with the second bank exhaust outlet and twists in order to guide exhaust from the second cylinder bank into a corresponding inlet (e.g., a second scroll) of the twin scroll turbine without mixing the exhaust gas from the second cylinder bank with exhaust gas from the first cylinder bank.

A spring 318 is physically coupled to the front support frame 306 at a first end and to the front portion 310 at a second end. The spring 318 is fully extended and turns the valve plate 305 to the first position, as shown. A stopper 320 is located near a top of the front portion 310 in order to align the front portion 310 with a barrier located between the first bank exhaust outlet and the second bank exhaust outlet. The spring 318 actuates the front portion 310 of the valve plate 305 toward the stopper 320 in a counterclockwise direction in the absence of an exhaust gas pressure greater than a force of the spring 318. The force of the spring 318 may be tiered such that the force of the spring 318 increases as the spring 318 is increasingly compressed.

The front portion 310 may divide a front of the valve 302 into a right hemisphere and a left hemisphere, where exhaust gas from the first cylinder bank flows into the right hemisphere (e.g., a first channel) and exhaust gas from the second cylinder bank flows into the left hemisphere (e.g., a second channel). Exhaust gas in the right hemisphere is guided by the upper side 314 of the valve plate 305 where the exhaust gas is led toward a top hemisphere near the rear portion 312 of the valve plate 305. Substantially all of the exhaust gas delivered to the top hemisphere is from the right hemisphere, and substantially no exhaust gas is delivered to the top hemisphere from the left hemisphere when the valve plate 305 is in the first position. Exhaust gas in the left hemisphere is guided by the lower side 316 of the valve plate 305 where the exhaust gas is led toward a bottom hemisphere near the rear portion 312 of the valve plate 305. Substantially all of the exhaust gas delivered to the bottom is from the left hemisphere, and substantially no exhaust gas is delivered to the bottom hemisphere from the right hemisphere when the valve plate 305 is in the first position. Exhaust gas in the top hemisphere may enter the first inlet of the twin scroll turbine and exhaust gas in the bottom hemisphere may enter the second inlet of the twin scroll turbine. In this way, exhaust gases from the first bank and the second bank may be maintained separate and do not after flowing through the valve 302 with the valve plate 305 in the first position.

FIG. 3 shows the valve in the first position, which may be in response to an engine condition comprising a low exhaust gas pressure (e.g., low load). The valve aligns with exhaust passages of first and second cylinder banks of the engine so that exhaust gases from the first and second cylinder banks do not mix. Thus, a first bank exhaust flow flows through a first channel of the valve and into a first scroll of the turbine without mixing with a second bank exhaust flow. The second bank exhaust flow flows through a second channel of the valve and into a second scroll of the turbine without mixing with the first bank exhaust flow. FIG. 4 shows the valve in the second position where the valve is no longer aligned with exhaust passages of the first and second cylinder banks and allows exhaust gas of the banks to mix.

Turning now to FIG. 4, a face-on isometric view 400 of the valve 302 in the second position is shown. A rear support frame 326 is visible in the embodiment of FIG. 4 due to a rotation of the valve body 305 as compared to its position in the embodiment of FIG. 3. A dividing wall between the first scroll and the second scroll of the turbine is perpendicular to the rear support frame 326 independent of a position of the valve body 305. As the valve body 305 moves toward the second position, the valve plate 320 and the front 306 and rear 326 supports are less misaligned, leading to greater mixing of gas between the first and second banks in the valve 302.

When in the second position, the valve body 305 is rotated away from the stopper 320 and the spring 318 is fully coiled. The front portion 310 is between the stopper 320 and the front support frame 306. The front portion 310 no longer aligns with the rear support frame 326. Likewise, the rear portion 312 no longer aligns with the front support frame 306. In this way, the front portion 310 and the rear portion 312 are oblique to the front support frame 306 and the rear support frame 326.

Due to the rotation of the valve body 305 to the second position, exhaust gas from the first bank and the second bank may at least partially mix in the valve 302. For example, the upper side 314 may receive gas from both the first bank and the second bank. Likewise, the lower side 316 may receive gas from both the first bank and the second bank. In this way, the first scroll and the second scroll of the turbine may both receive a mixture comprising exhaust gas from the first and second banks.

Exhaust gas entering the first scroll may be from both the upper side 314 (e.g., a first channel) and the lower side 316 (e.g., a second channel). Exhaust gas in the upper side 314 is maintained separate from exhaust gas in the lower side 316, however, exhaust gas from the upper side 314 and the lower side 316 may mix in one or more of the first scroll and the second scroll.

The upper side 314 may direct a gas mixture to both the bottom and top hemispheres when the valve body 305 is in the second position and as a result, directs the gas mixture to both the first and second scrolls. Likewise, the lower side 316 may direct gas to both the bottom and top hemispheres and to both the first and second scrolls when the valve body 305 is in the second position. However, exhaust gas in contact with the upper side 314 of the valve body 305 may not interact with exhaust gas in contact with the lower side 316 of the valve body 305 while flowing in the valve 302.

The valve body 305 may be rotated to the second position in response to an increased exhaust pressure. The exhaust pressure may increase in response to an engine condition (e.g., increased engine load). By rotating the valve body 305 to the second position, pressure losses within the turbine may be decreased along with engine pumping losses. Additionally, exhaust gas backpressure may be decreased and/or prevented. Furthermore, exhaust gas from the first and the second banks may be mixed within the valve 302 before flowing to the twin scroll turbine.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Turning now to FIG. 5, a method 500 for operating a valve is depicted. The valve may be used similarly to the valve 302 in the embodiment of FIGS. 3 and/or 4. As described above, the valve is an automatic valve and is actuated based on a changing exhaust gas pressure in response to a changing engine operation. Thus, the valve is not electronically actuated.

The method 500 may be described with reference to components described above. Specifically, engine 10, turbine 92 adapter 200, valve body 220, first channel 208, second channel 210, top side 209, bottom side 211, spring 230, and stopper 228 of FIGS. 1 and 2.

The method 500 begins at 502 where the method 500 determines, estimates, and/or measures current engine operating parameters. The current engine operating parameters may include one or more of engine load, engine speed, exhaust pressure, manifold vacuum, vehicle speed, EGR, and air/fuel ratio.

At 504, the method 500 determines if an engine load is greater than a first threshold. The first threshold may be based on a low engine load where an exhaust pressure is not great enough to overcome a force of the spring (e.g., spring 230) coupled to the valve (e.g., valve body 220).

If the engine load is not greater than the first threshold, then the engine may be in a low load and the method 500 proceeds to 506 to maintain current engine operating parameters and to turn the valve to the first position. Exhaust gas in the low load may be unable to overcome the force of the spring. The valve body is pressed against the stopper (e.g., the stopper 228) in the valve and the spring is fully extended.

At 508, the method 500 does not mix exhaust gas from the first and second banks. As described above, the first position maintains exhaust gases from the first cylinder bank and the second cylinder bank separate and as a result, exhaust gas from the first bank flows into a first scroll of a twin scroll turbine via the first channel of the adapter and exhaust gas from the second bank flows into a second scroll of the twin scroll turbine via the second channel of the adapter. In this way, the first channel aligns with a first bank exhaust outlet at an upstream end and aligns with the first scroll of the turbine at a downstream end. The second channel aligns with a second bank exhaust outlet at an upstream end and aligns with the second scroll of the turbine at a downstream end.

Returning to 504, if the engine load is greater than the first threshold, then the method 500 proceeds to 510 to determine if the engine load is greater than a second threshold, where the second threshold is greater than the first threshold. The second threshold may be based on a high engine load where exhaust gas pressure is greater enough to fully compress the spring of the valve.

If the engine load is not greater than the second threshold, then the method 500 proceeds to 512 to turn the valve in a clockwise direction in order to position the valve between the first and second positions. In this way, the engine load may be a mid-load, where exhaust gas is strong enough to partially compress the spring coupled to the valve. In this way, a force of the spring may be incremented such that the force of the spring gradually increases as the spring is compressed.

At 514, the method 500 includes at least partially mixing exhaust gas from the first and second banks within the valve. The valve does not align with exhaust passages from the first and second banks, thus the first channel and the second channel of the valve may receive exhaust gases from both the first bank and the second bank. As a result, a pressure drop across the turbine is decreased and engine pumping losses may be decreased.

The first channel may deliver an exhaust mixture of gases from the first and second banks to both the first scroll and the second scroll. The second channel may deliver an exhaust mixture of gases from the first and second banks to both the first scroll and the second scroll. As the valve is rotated farther to the second position, the first channel may provide an increased amount of exhaust to the second scroll and a decreased amount to the first scroll. The second channel may provide an increased amount of exhaust to the first scroll and a decreased amount to the second scroll. Additionally or alternatively, the mixture of exhaust gases from the first bank and the second bank in the first channel and the second channel may become increasingly even as the valve body is rotated to the second position.

Returning to 510, if the engine load is greater than the second threshold, then the method 500 proceeds to 516 to turn the valve clockwise to the second position in response to an increased exhaust gas pressure. The engine load may be a high load where exhaust gas pressure is great enough to overcome an entire force of the spring and as a result, the exhaust gas fully compresses the spring and the valve moves to the second position.

At 518, the method 500 mixes exhaust gas from the first and second banks in the valve before the exhaust gas flows to the turbine. The exhaust gas mixing in the second position is greater than the exhaust gas mixing for the valve between the first and second positions. This may be due to a greater degree of misalignment between the valve and the exhaust passages of the first and second banks.

In this way, an adaptor with a valve located therein may be automatically actuated in response to a changing exhaust pressure. At higher exhaust pressures, the valve rotates to a second position and allows exhaust gases from first and second cylinder banks to mix in order to decrease a pressure loss across a turbine and to decrease engine pumping losses. At lower exhaust pressures, the valve rotates to a first position and maintains a separation of exhaust gases from the first and second cylinder banks in order to increase boost pressure and torque at lower engine loads. The technical effect of using an automatic valve is to reduce manufacturing costs and to increase engine performance.

In a first example, a turbocharger system comprising a first scroll, a second scroll, fluidically separated from the first scroll via a dividing wall, an adaptor coupled to an outlet of an exhaust manifold, an inlet of the first scroll, and an inlet of the second scroll, and a twisted valve coupled within the adaptor to rotate in response to a non-electrical actuation of a spring.

In a first embodiment of the first example, the first example may additionally or alternatively include where the non-electrical actuation is an exhaust pressure.

In a second embodiment of the first example, which may optionally include the first embodiment, the first example may additionally or alternatively include where the twisted valve rotates to a first position in response to an exhaust pressure being less than a force of the spring, and where the twisted valve maintains a fluid separation of exhaust gas from a first cylinder bank and a second cylinder bank.

In a third embodiment of the first example, which may optionally include the first and second embodiments, the first example may additionally or alternatively include where the twisted valve rotates to a second position in response to an exhaust pressure overcoming a force of the spring, and where the twisted valve allows exhaust gas from a first cylinder bank to fluidly communicate with exhaust gas from a second cylinder bank.

In a fourth embodiment of the first example, which may optionally include the first through third embodiments, the first example may additionally or alternatively include where the adaptor further comprises a support frame with a central rotatable portion physically coupled to the twisted valve and front and rear supports coupled to the central portion, wherein the front and rear supports are fixed.

In a fifth embodiment of the first example, which may optionally include the first through fourth embodiments, the first example may additionally or alternatively include where the twisted valve divides the adapter into a first channel and a second channel, and where the first channel aligns with the first scroll and the second channel aligns with the second scroll when the twisted valve is in a first position.

In a sixth embodiment of the first example, which may optionally include the first through fifth embodiments, the first example may additionally or alternatively include where the first channel and the second channel are misaligned with the first and second scrolls of the turbine when the twisted valve is rotated to a second position.

In a seventh embodiment of the first example, which may optionally include the first through sixth embodiments, the first example may additionally or alternatively include where exhaust in the first channel is maintained separate from exhaust in the second channel throughout a length of the adapter.

In a second example, a method comprising maintaining gas from a first bank and a second bank separate via rotating a twisted valve to a first position and mixing exhaust gas from the first bank and the second bank via rotating the twisted valve to a second position.

In a first embodiment of the second example, the second example may additionally or alternatively include flowing gas through an adaptor housing the valve, wherein the adaptor comprises a first channel hermitically sealed from a second channel.

In a second embodiment of the second example, which may optionally include the first embodiment, the second example may additionally or alternatively include where the valve in the first position includes flowing exhaust from the first bank, to the first channel, and into a first scroll of a turbine without mixing exhaust from the first bank with exhaust from the second bank, and where the valve in the first position further includes flowing exhaust from the second bank, to the second channel, and into a second scroll of the turbine without mixing exhaust from the second bank with exhaust from the first bank.

In a third embodiment of the second example, which may optionally include the first and/or second embodiments, the second example may additionally or alternatively include where the valve in the second position includes flowing exhaust from the first bank and the second bank to both the first channel and the second channel and where both the first channel and the second channel deliver a mixture of exhaust from the first and second banks to both the first and second scrolls of the turbine.

In a third example, a system comprising an engine with a first cylinder bank and a second cylinder bank, where the first cylinder bank comprises at least one cylinder and the second cylinder bank comprises a different cylinder, a turbocharger comprising a twin scroll turbine, a first scroll and a second scroll of the twin scroll turbine are maintained separate via a barrier, an adapter coupled to an exhaust manifold of the engine at an upstream end and coupled to the turbine at a downstream end, a twisted valve plate of the adapter extending along an entire length of the adapter and dividing the adapter into a first channel and a second channel, and a spring able to rotate the valve in response to a non-electrical actuation.

In a first embodiment of the third example, the third example may additionally or alternatively include where the exhaust manifold is bifurcated to accommodate an exhaust outlet of the first bank and an exhaust outlet of the second bank.

In a second embodiment of the third example, which may optionally include the first embodiment, the third example may additionally or alternatively include where exhaust gas in the first channel does not mix with exhaust gas in the second channel in the adapter.

In a third embodiment of the third example, which may optionally include the first and/or second embodiments, the third example may additionally or alternatively include where the spring is biased and rotates the twisted valve plate toward a stopper located within the adapter.

In a fourth embodiment of the third example, which may optionally include the first through third embodiments, the third example may additionally or alternatively include where the spring compresses in response to an increased exhaust pressure and rotates the twisted valve plate away from the stopper.

In a fifth embodiment of the third example, which may optionally include the first through fourth embodiments, the third example may additionally or alternatively include where the valve plate further comprises a front portion and a rear portion, and where the front portion is perpendicular to the rear portion.

In a sixth embodiment of the third example, which may optionally include the first through fifth embodiments, the third example may additionally or alternatively include where the adapter further comprises a support frame with a front support, central support and rear support.

In a seventh embodiment of the third example, which may optionally include the first through sixth embodiments, the third example may additionally or alternatively include where the front and rear supports are fixed and the central support is rotatable and physically coupled to the valve plate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger system, comprising:
a first scroll;
a second scroll, fluidically separated from the first scroll via a dividing wall;
an adapter coupled to an outlet of an exhaust manifold, an inlet of the first scroll, and an inlet of the second scroll; and
a twisted valve coupled within the adapter actuated to rotate in response to an exhaust pressure, wherein the twisted valve comprises a front portion and a rear portion, and where the front portion is perpendicular to the rear portion.

2. The turbocharger of claim 1, wherein the exhaust pressure includes exhaust pressure acting on the twisted valve relative to a force of a spring connected to the twisted valve.

3. The turbocharger system of claim 2, wherein the twisted valve rotates to a first position in response to the exhaust pressure being less than the force of the spring, and where the twisted valve maintains a fluid separation of exhaust gas from a first cylinder bank and a second cylinder bank.

4. The turbocharger system of claim 2, wherein the twisted valve rotates to a second position in response to the exhaust pressure overcoming the force of the spring, and where the twisted valve allows exhaust gas from a first cylinder bank to fluidly communicate with exhaust gas from a second cylinder bank.

5. The turbocharger system of claim 1, wherein the adapter further comprises a support frame with a central rotatable portion physically coupled to the twisted valve and front and rear supports coupled to the central portion, wherein the front and rear supports are fixed.

6. The turbocharger system of claim 1, wherein the twisted valve divides the adapter into a first channel and a second channel, and where the first channel aligns with the first scroll and the second channel aligns with the second scroll when the twisted valve is in a first position.

7. The turbocharger system of claim 6, wherein the first channel and the second channel are misaligned with the first and second scrolls when the twisted valve is rotated to a second position.

8. The turbocharger system of claim 6, wherein exhaust in the first channel is maintained separate from exhaust in the second channel throughout a length of the adapter.

9. A method, comprising:
maintaining exhaust gas from a first cylinder bank and a second cylinder bank separate via rotating a twisted valve to a first position and mixing exhaust gas from the first cylinder bank and the second cylinder bank via exhaust gas induced rotation of the twisted valve to a second position, wherein the twisted valve is housed inside an adapter comprising a first channel hermitically sealed from a second channel.

10. The turbocharger of claim 9, further comprising flowing exhaust gas through the adapter housing the twisted valve.

11. The method of claim 10, wherein the twisted valve in the first position includes flowing exhaust gas from the first cylinder bank to the first channel, and into a first scroll of a turbine without mixing exhaust gas from the first cylinder bank with exhaust gas from the second cylinder bank, and where the twisted valve in the first position further includes flowing exhaust gas from the second cylinder bank to the second channel, and into a second scroll of the turbine without mixing exhaust gas from the second cylinder bank with exhaust gas from the first cylinder bank.

12. The method of claim 11, wherein the twisted valve in the second position includes flowing exhaust from the first cylinder bank and the second cylinder bank to both the first channel and the second channel and where both the first channel and the second channel deliver a mixture of exhaust gas from the first and second cylinder banks to both the first and second scrolls of the turbine.

13. A system, comprising:
an engine with a first cylinder bank and a second cylinder bank, where the first cylinder bank comprises at least a first cylinder and the second cylinder bank comprises at least a second cylinder different than the first cylinder;
a turbocharger comprising a twin scroll turbine;
a first scroll and a second scroll of the twin scroll turbine are maintained separate via a barrier;
an adapter coupled to an exhaust manifold of the engine at an upstream end and coupled to the turbine at a downstream end;
a twisted valve plate of the adapter comprising a front portion and a rear portion, where the front portion is perpendicular to the rear portion, the twisted valve plate extending along an entire length of the adapter and dividing the adapter into a first channel and a second channel; and
a spring able to rotate the twisted valve plate in response to a non-electrical actuation.

14. The system of claim 13, wherein the exhaust manifold is bifurcated to accommodate an exhaust outlet of the first cylinder bank and an exhaust outlet of the second cylinder bank.

15. The system of claim 13, wherein exhaust gas in the first channel does not mix with exhaust gas in the second channel in the adapter.

16. The system of claim 13, wherein the spring is biased and rotates the twisted valve plate toward a stopper located within the adapter.

17. The system of claim 16, wherein the spring compresses in response to an increased exhaust pressure and rotates the twisted valve plate away from the stopper.

18. The system of claim 13, wherein the twisted valve plate further comprises a twisted central portion located between the front portion and the rear portion of the twisted valve plate.

19. The system of claim 13, wherein the adapter further comprises a support frame with a front support, a central support, and a rear support.

20. The system of claim 19, wherein the front and rear supports are fixed and the central support is rotatable and physically coupled to the twisted valve plate.

* * * * *